United States Patent [19]
Yoshikawa et al.

[11] 3,930,830
[45] Jan. 6, 1976

[54] METHOD FOR PRODUCING GLASS ARTICLES

[75] Inventors: Naohiro Yoshikawa, Otsu; Takashi Yamaoka, Kusatsu, both of Japan

[73] Assignee: Nippon Electric Glass Company, Limited, Shiga, Japan

[22] Filed: Sept. 25, 1974

[21] Appl. No.: 509,279

[30] Foreign Application Priority Data
Sept. 26, 1973 Japan.............................. 48-107512

[52] U.S. Cl. .......................... 65/85; 65/86; 65/116; 65/117
[51] Int. Cl.² ......................................... C03B 15/14
[58] Field of Search ............ 65/83, 85, 86, 87, 116, 65/117, 118, 119, 99 A

[56] References Cited
UNITED STATES PATENTS
3,260,586   7/1966   Prohaszka et al....................... 65/86

Primary Examiner—Arthur D. Kellogg
Attorney, Agent, or Firm—Kurt Kelman

[57] ABSTRACT

A method for forming a glass article of a devitrifiable glass having an optimum working temperature in the vicinity of its liquidus temperature, wherein the temperature of the molten glass is, during the molding operation, maintained at considerably higher temperature than both the optimum working temperature and the liquidus temperature, the molded article is passed through water or a layer of wet granular materials floating in water before the temperature of the molded article drops down to the liquidus temperature and before the molded article is deformed to rapidly cool the article to a temperature below the devitrifying temperature.

8 Claims, 4 Drawing Figures

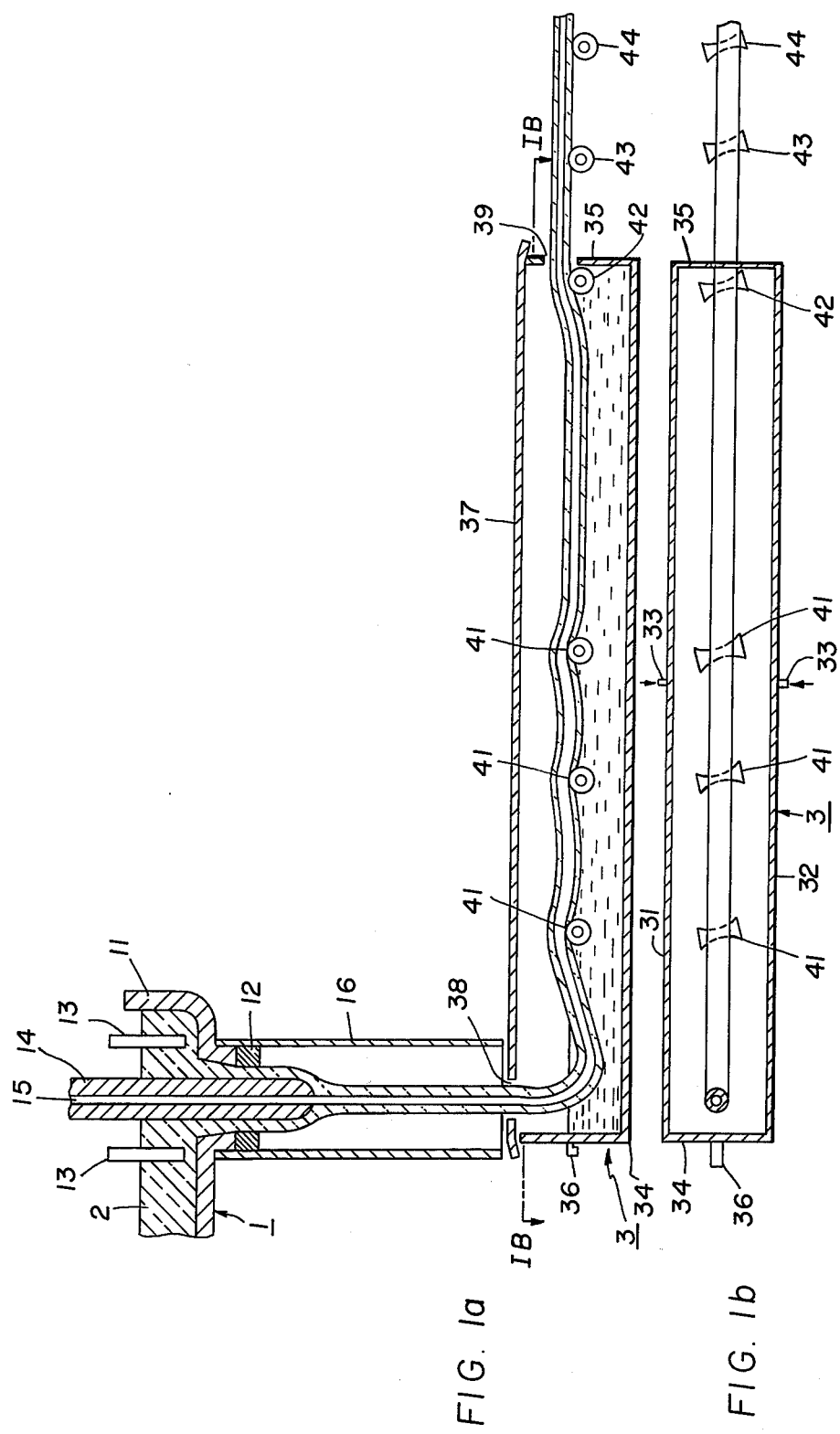

METHOD FOR PRODUCING GLASS ARTICLES

BACKGROUND OF THE INVENTION

This invention relates to a method for producing a glass article of a devitrifiable glass without occurence of any devitrification.

Generally, glass articles are produced by molding molten glass and then cooling the molded glass. Various molding methods have been known such as casting, blowing, drawing, swaging and rolling, and a suitable method is employed for an article to be molded.

The glass molding operation is effected at a temperature in the workable temperature range of the glass, and the optimum working temperature is determined by the composition of the glass to be used, the shape of the article and, therefore, the method employed.

In cooling the molded glass, devitrifications may disadvantageously develop if the molded glass is maintained for a considerable period at a certain temperature range below the liquidus temperature of the glass, which has been usually referred as a devitrifying temperature range.

If the working temperature in producing a glass article is within the devitrifying temperature range of the glass, devitrification may take place during the molding operation to cause loss of transparency, deterioration of the mechanical strength and deterioration of the commercial value of the product.

In order to avoid these disadvantages, the composition of glass has been so selected that the working temperature is sufficiently removed from the liquidus temperature to be outside the devitrifying temperature range.

There are, however, certain cases where such selection of the glass composition is not possible because of the properties of the glass article to be obtained.

A method for obtaining a glass article without devitrification of a glass having a working temperature within or close to the devitrifying temperature range is of great benefit.

Such a method is disclosed in Japanese Pat. Publication NO. 38519/1971. According to this method, a devitrifiable glass is prepared in the form of powdery glass and then such powdery glass is molded into a desired article by using an extrusion molding method at a temperature below the devitrifying temperature range. In this method, since the temperature of the glass is not elevated above the devitrifying temperature range during the producing process, there is no chance for devitrification to take place. This method, however, requires enlarged producing installations. Moreover, since the glass must be prepared in the form of powdery glass and then again heated and shaped, the producing steps are extremely complicated and pose an economical problem.

SUMMARY OF THE INVENTION

An object of this invention is to provide a method for forming a glass article of a devitrifiable glass whose working temperature is in the vicinity of the liquidus temperature without developing any devitrification and with simple production facilities, at low cost and in commercial quantities.

This invention provides a method for forming a glass article of a glass having a working temperature in the vicinity of the liquidus temperature thereof, which comprises the steps of preparing molten glass at an elevated temperature higher than the working temperature and the liquidus temperature, molding the molten glass into an article, putting the molded glass article into water before the temperature of the molded article drops down to the liquidus temperature and before the molded article is deformed to rapidly cool the article to a temperature below the devitrifying temperature range of the glass, and subjecting the article to the annealing treatment.

The molded article may be, preferably, put into a layer of wet granular materials, for example cork grains, which float in water.

Further objects and features of this invention will be understood from the following detailed description relating to embodiments of this invention with reference to the annexed drawings.

BRIEF DESCRIPTION OF THE DRAWINGS

FIG. 1a diagrammatically shows a sectional view of an embodiment of this invention, FIG. 1b shows a sectional view taken along the line IB—IB of FIG. 1a, FIG. 2a diagrammatically shows a sectional view of another embodiment, and FIG. 2b shows a sectional view taken along the line IIB—IIB in FIG. 2a.

DETAILED DESCRIPTION OF PREFERRED EMBODIMENTS

Figures 2A, 2B:
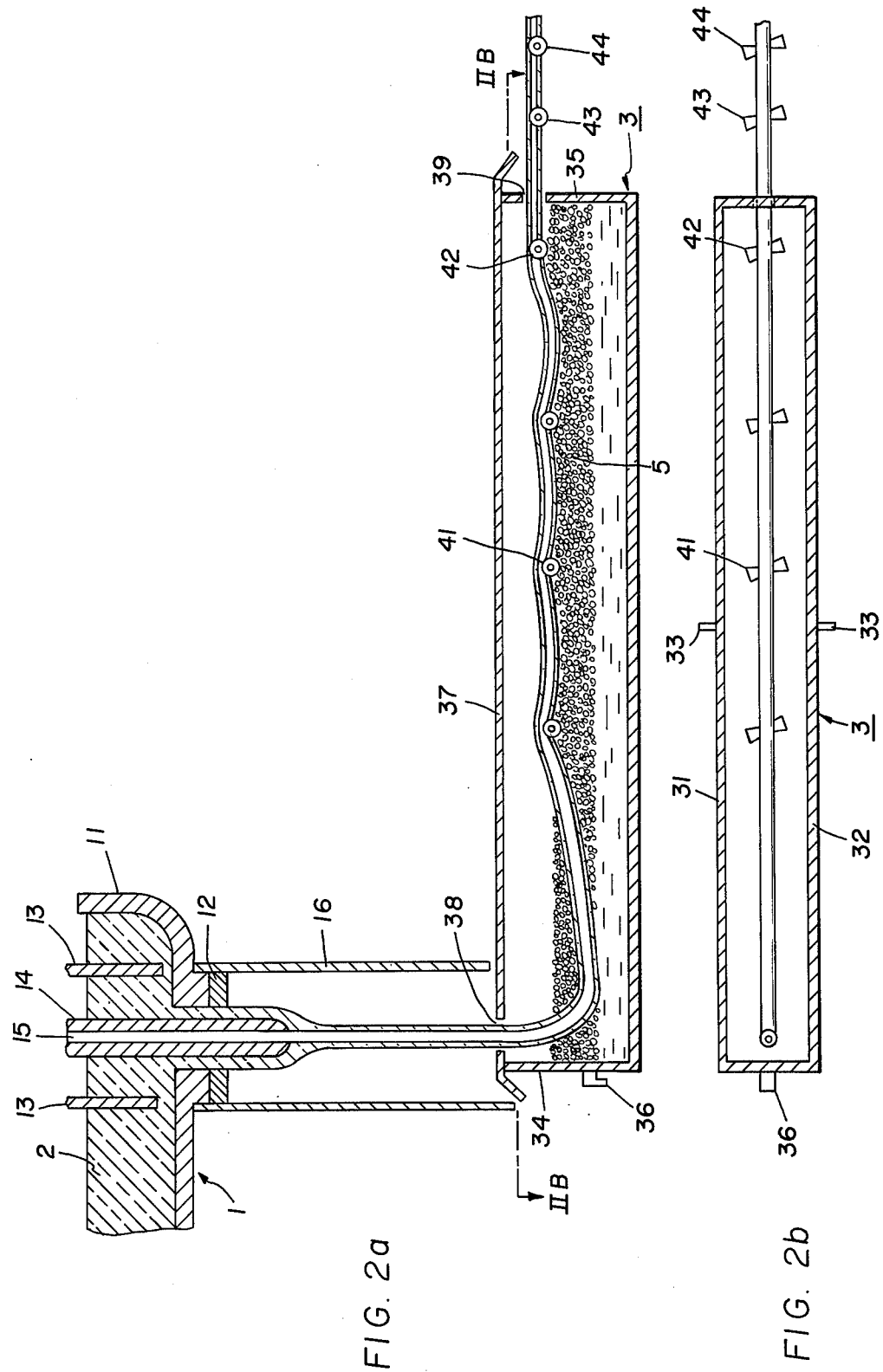

Briefly stated, this invention intends to maintain the temperature of the molten glass during the molding operation at a considerably higher temperature than the working temperature and the liquidus temperature of the glass and to rapidly cool the molded glass from the higher temperature to a temperature below the devitrifying temperature range of the glass, to permit producing a glass article without devitrification from a devitrifiable glass having a working temperature in the vicinity of the liquidus temperature of the glass.

Referring first to FIGS. 1a and 1b, which illustrate a first embodiment of this invention as adapted for producing glass tubes, the feeder 1 is connected to a glass melting chamber (not shown) and supplied with molten glass 2 therefrom, as is well known. Feeder 1 comprises a spout 11, a downwardly opened orifice 12, and tubes 13 inserted downwardly into the molten glass in spout 11 and arranged symmetrical to each other on both sides of the central axis of the opening of orifice 12. A mandrel 14 is inserted vertically downwardly through molten glass 2 so as to project downwardly from the opening of orifice 12. A ring-shaped space is formed between the outer periphery of mandrel 14 and the inner periphery of the opening of orifice 12. Mandrel 14 also has axial bore 15 that extends along the length of the mandrel so that air is blown in from the top end opening of the bore.

The end portion of the mandrel 14 that extends downwardly from the orifice 12 has a curved surface gently converging toward the center axis. A downwardly extending muffle 16 surrounds the mandrel 14 and orifice 12 and is secured to the underside of the spout 11.

As is well known, a temperature control device is provided for feeder 1 to control the temperature of the molten glass at a predetermined temperature.

Water tank 3 is fixedly arranged under the feeder 1 and the bottom end of the muffle 16. The water tank 3 is a long one elongating in a horizontal direction and so disposed that the top surface at its one end portion faces the bottom end of the muffle 16. Two opposed side walls 31 and 32 extending longitudinally of the water tank are provided with water feeding ports 33. A water discharging port 36 is provided in one of the shorter oppposed side walls 34 and 35 which is located at the end portion adjacent to muffle 16.

The water feeding ports 33 can be moved to the best suited positions which are determined according to the size of the product, tube drawing speed and other factors, while the vertical position of the water discharging port 36 is so selected that water in the water tank will maintain a desired water level.

The water tank is provided with a cover 37 over the top opening of the water tank. At a portion of cover 37 facing the muffle 16, a hole 38 is formed at the position just below the mandrel 14. In the side wall 35, a hole 39 is formed at a position higher than the water level in the water tank.

Rollers 41, 42, 43 and 44, are arranged spaced-apart from each other longitudinally along the center axis of the water tank and are so disposed that the axis of revolution of each roller crosses the center axis of the water tank at an angle other than the right angle. These rollers 41, 42, 43 and 44 facilitate continuous advancement of the molded glass tube and secure the vertical position thereof, as more fully described later. These rollers are driven by a power source (not shown). For instance, an electric motor may be used as a power source for rotating these rollers, in which the rotating force of the motor is transmitted through a chain-and-sprocket drive. The roller driving mechanism is of a type well known in the art, so no further explanation of such mechanism will be necessary here. The rollers 41 are disposed in the water tank at a vertical level lower than but close to the water surface in the tank, while the roller 42 is located at a vertical position suitable for guiding the glass tube to the hole 39.

The glass material is melted in the melting chamber and molten glass 2 is continuously supplied from said chamber into feeder 1. The molten glass 2 is kept at a temperature higher than the optimum working temperature and the liquidus temperature of the glass. The spout 11 may be provided with a known type of heating means for maintaining the temperature of molten glass 2.

The molten glass 2 supplied to the feeder 1 passes through the ring-shaped space formed between the inner surface of the orifice 12 and the periphery of the mandrel 14 and flows down along the surface of mandrel 14. Since the end of the mandrel 14 converges, the molten glass flowing down along the mandrel surface tends to join at the end of the mandrel. However, as air is being fed into the central bore 15 of the mandrel 14, the molten glass is molded into the form of a tube having a central bore.

After leaving the mandrel 14, the molded tube further descends to enter the water tank 3 through the opening 38 in the cover 37 and is immersed and cooled by water in the water tank.

Upon entering the water tank 3, the molded glass is bent in the longitudinal direction of the water tank and further guided forward by the rollers 41, 42 which are rotating about their respective center axes to impart forward motion to the glass tube. The glass tube is then discharged out from the water tank through the hole 39 and carried to the next working station, for example a tube cutting machine, by means of rollers 43, 44.

When emerging from the water tank 3, the glass tube is already cooled to a temperature below the devitrifying temperature range. That is, the glass tube which has been molded by the mandrel and which still maintains a temperature higher than the working temperature and the liquidus temperature is rapidly cooled to a temperature below the devitrifying temperature range during a short period of time from entrance into the water tank to emergence therefrom, so that a nondevitrified glass tube is discharged from the water tank.

The feed and rotation of the glass tube can be accomplished by means of a traction device disposed at the feed end of the glass tube.

Since the molten glass 2 has an extremely high temperature and hence is very flowable, the thickness of the tube wall, during a pass from the mandrel 14 to the water tank, as well as the tube diameter are gradually reduced.

It is, thus, possible to obtain a desired tube by suitably dimensioning not only the bore of the orifice 12 and the diameter of the mandrel 14 but also the distance between the mandrel and the water tank according to the desired tube diameter and wall thickness.

In the above embodiment, a glass rod may be molded if the mandrel 14 (FIG. 1a) is not used or is not provided with a central hole 15. Furthermore if the orifice 12 is a slit, a plate may be molded.

In the above-described embodiment, although no devitrification occurs, some tubes which emerged from the water tank were rugged in their general configuration. Such deformation can be avoided by passing the glass tube through a layer of water-wetted grains, such as corks 5, floated in the water in the water tank 3, as shown in FIG. 2a.

An example of easily devitrifyable glass to which this invention is applicable is shown in Table 1. The working temperature of this glass for tube drawing is approximately 1,330°C (viscosity $10^{4.0}$ poises). This temperature is very close to the liquidus temperature of this glass (about 1,310°C), so that devitrification inevitably occurs in the ordinary producing methods.

Table 1

| Ingredients | Weight ratio (%) |
|---|---|
| $SiO_2$ | 64.4 |
| $Al_2O_3$ | 22.9 |
| $Li_2O$ | 4.3 |
| $MgO$ | 0.5 |
| $P_2O_5$ | 1.4 |
| $ZrO_2$ | 2.3 |
| $TiO_2$ | 1.5 |
| $Na_2O$ | 0.5 |
| $K_2O$ | 0.2 |
| $As_2O_3$ | 1.4 |
| $Sb_2O_3$ | 0.6 |

If the molten glass having the composition of Table 1 is supplied to the feeder at its working temperature (1,330°C) and then drawn out through the ring-shaped space between the mandrel and the orifice in the similar way as in FIG. 1, the molten glass begins to cool down upon emerging from the orifice. Therefore, the temperature of the molten glass drops down to a temperature within the devitrifying temperature range of the glass during the molding operation so that devitrification may develop.

However, according to this invention, since molten glass of a temperature considerably higher than the working temperature and the liquidus temperature, for example 1,385°C (viscosity $10^{3.7}$ poises) is, molded by combination of the mandrel and orifice into a tube, which, in turn, is immersed in water before cooling down to the devitrifying temperature range of the glass so as to be rapidly cooled to a temperature below the devitrifying temperature range, it is possible to obtain a glass tube of the composition of Table 1 without causing devitrification.

It will be apparent that this invention can be employed for producing glass articles without causing devitrification by using glass not only of the composition of Table 1 but also of other compositions in which the working temperature lies near the liquidus temperature of the glass.

It will be also noted that the method of this invention can be preferably applied not only to a pressing method and pull-up method but to a down-draw method and a dunner method in which the molten glass is flown downwardly from the feeder to mold a product. It is also possible with the method of this invention to produce not only tubes but also other articles that can be molded by the molding methods in which this invention is employable.

What we claim is:

1. An improved method for producing an article of a molten glass having an optimum working temperature and a liquidus temperature, comprising the steps of
   1. molding the molten glass into the article at a temperature higher than the optimum working and liquidus temperatures, and
   2. placing the molded glass article into contact with water before the temperature of the molded glass article drops down to the liquidus temperature whereby the molded glass article passes rapidly through the devitrifying temperature of the glass and devitrification of the glass is inhibited.

2. The improved method of claim 1, wherein the molded glass article is placed into contact with water by passing it through a water bath.

3. The improved method of claim 1, wherein the molded glass article is placed into contact with water by passing it through a layer of water-wetted granular material floating on water.

4. The improved method of claim 3, wherein the granular material is cork.

5. An improved method for producing an elongated article of a devitrifiable glass having an optimum working temperature in the vicinity of the liquidus temperature thereof, comprising the steps of
   1. heating the glass to a temperature higher than the optimum working and liquidus temperatures thereof to melt the glass,
   2. feeding the molten glass to a molding station whereat the molten glass is maintained at the higher temperature,
   3. continuously leading the molten glass at the higher temperature through a molding orifice at the molding station, and
   4. leading the molded glass article into contact with water before the temperature of the molded glass article drops down to the liquidus temperature whereby the molded glass article passes rapidly through the devitrifying temperature of the glass and devitrification of the glass is inhibited.

6. The improved method of claim 5, wherein the molded glass article is placed into contact with water by passing it through a water bath.

7. The improved method of claim 5, wherein the molded glass article is placed into contact with water by passing it through a layer of water-wetted granular material floating on water.

8. The improved method of claim 7, wherein the granular material is cork.

* * * * *